(12) United States Patent
Pinger et al.

(10) Patent No.: US 11,135,895 B2
(45) Date of Patent: Oct. 5, 2021

(54) HVAC CASE

(71) Applicants: DENSO International America, Inc., Southfield, MI (US); DENSO CORPORATION, Kariya (JP)

(72) Inventors: Michael Pinger, Clawson, MI (US); Yoshinobu Mochizuki, Farmington Hills, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 232 days.

(21) Appl. No.: 16/014,277

(22) Filed: Jun. 21, 2018

(65) Prior Publication Data

US 2019/0322152 A1 Oct. 24, 2019

Related U.S. Application Data

(60) Provisional application No. 62/660,012, filed on Apr. 19, 2018.

(51) Int. Cl.
*B60H 1/00* (2006.01)
*B60S 1/54* (2006.01)

(52) U.S. Cl.
CPC ..... *B60H 1/00514* (2013.01); *B60H 1/00564* (2013.01); *B60H 1/00678* (2013.01); *B60S 1/54* (2013.01); *B60H 2001/00714* (2013.01)

(58) Field of Classification Search
USPC .......................................................... 454/124
See application file for complete search history.

(56) References Cited

U.S. PATENT DOCUMENTS

| 5,025,711 | A | 6/1991 | Cassidy |
| 7,281,574 | B2* | 10/2007 | Shibata ............. B60H 1/00064 |
| | | | 165/203 |
| 2011/0105007 | A1 | 5/2011 | Jia et al. |
| 2017/0282686 | A1* | 10/2017 | Wisniewski ....... B60H 1/00842 |
| 2018/0105019 | A1* | 4/2018 | Haupt ................ B60H 1/00021 |
| 2018/0105147 | A1* | 4/2018 | Iyer ....................... F25D 21/125 |

FOREIGN PATENT DOCUMENTS

JP 2015042521 A 3/2015

* cited by examiner

*Primary Examiner* — Vivek K Shirsat
(74) *Attorney, Agent, or Firm* — Harness, Dickey & Pierce, P.L.C.

(57) ABSTRACT

A heating, ventilation, and air conditioning (HVAC) case, which defines a defrost outlet and a demist outlet. A single airflow control door is movable to control airflow through each one of the defrost outlet and the demist outlet.

13 Claims, 4 Drawing Sheets

HVAC CASE

CROSS-REFERENCE TO RELATED APPLICATIONS

This application claims the benefit of U.S. Provisional Application No. 62/660,012, filed on Apr. 19, 2018. The entire disclosure of the above application is incorporated herein by reference.

FIELD

The present disclosure relates to a heating, ventilation, and air conditioning (HVAC) case, such as a vehicle HVAC case including a dedicated defrost and demist door.

BACKGROUND

This section provides background information related to the present disclosure, which is not necessarily prior art.

Heating, ventilation, and air conditioning (HVAC) systems, such as for vehicles, often include a case that defines various airflow outlets and includes numerous doors movable to control airflow through the outlets. For example, and as illustrated in prior art FIGS. 1 and 2, an existing HVAC case 110 typically defines a defrost outlet 112, demist outlets 114A and 114B, face outlets 116A and 116B, and foot outlets 118. Airflow from the defrost outlet 112 is directed to a front windshield of the vehicle, and airflow from the demist outlets 114A/114B is directed to side windows of the vehicle. To control airflow through the defrost and demist outlets, existing HVAC cases require multiple airflow control doors 130/132 (FIG. 2), each of which require a door linkage. While current HVAC cases are suitable for their intended use, they are subject to improvement. The present disclosure advantageously includes an improved HVAC case with a more efficient and simplified airflow control door arrangement, as described in detail herein.

SUMMARY

This section provides a general summary of the disclosure, and is not a comprehensive disclosure of its full scope or all of its features.

The present disclosure provides for a heating, ventilation, and air conditioning (HVAC) case, which defines a defrost outlet and a demist outlet. A single airflow control door is movable to control airflow through each one of the defrost outlet and the demist outlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 6:
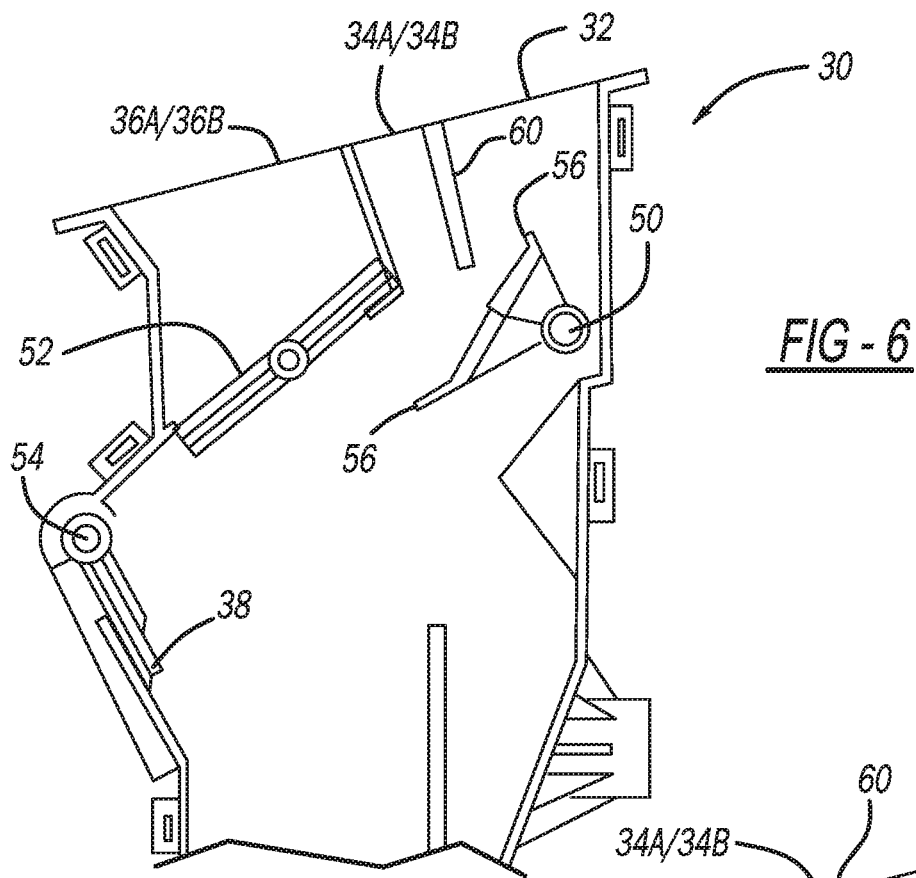
Figure 7:
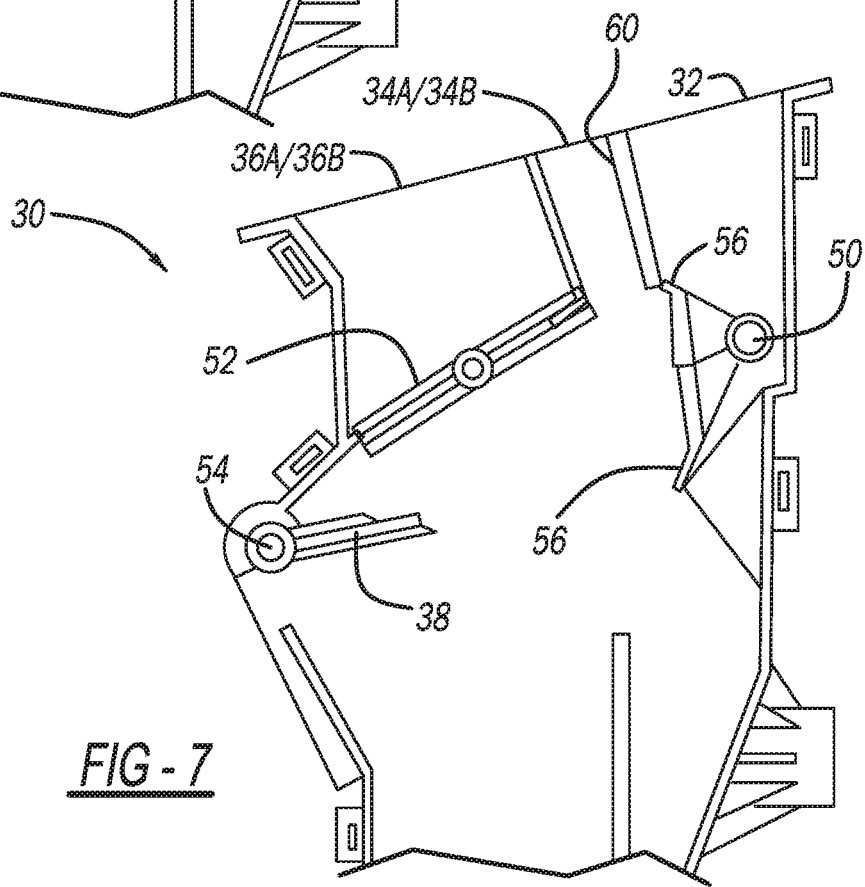

FIG. 6 is a cross-sectional view of the HVAC case of the present disclosure with the airflow control door in a first open position to permit airflow past the airflow control door and out of the HVAC case through the defrost outlet and the demist outlet; and FIG. 7 is a cross-sectional view of the HVAC case of the present disclosure with the airflow control door in a second open position in which the airflow control door extends across the defrost outlet to block airflow therethrough, and is positioned to permit airflow past the airflow control door and out of the HVAC case through the demist outlet.

Corresponding reference numerals indicate corresponding parts throughout the several views of the drawings.

DETAILED DESCRIPTION

Example embodiments will now be described more fully with reference to the accompanying drawings.

Figure 3:
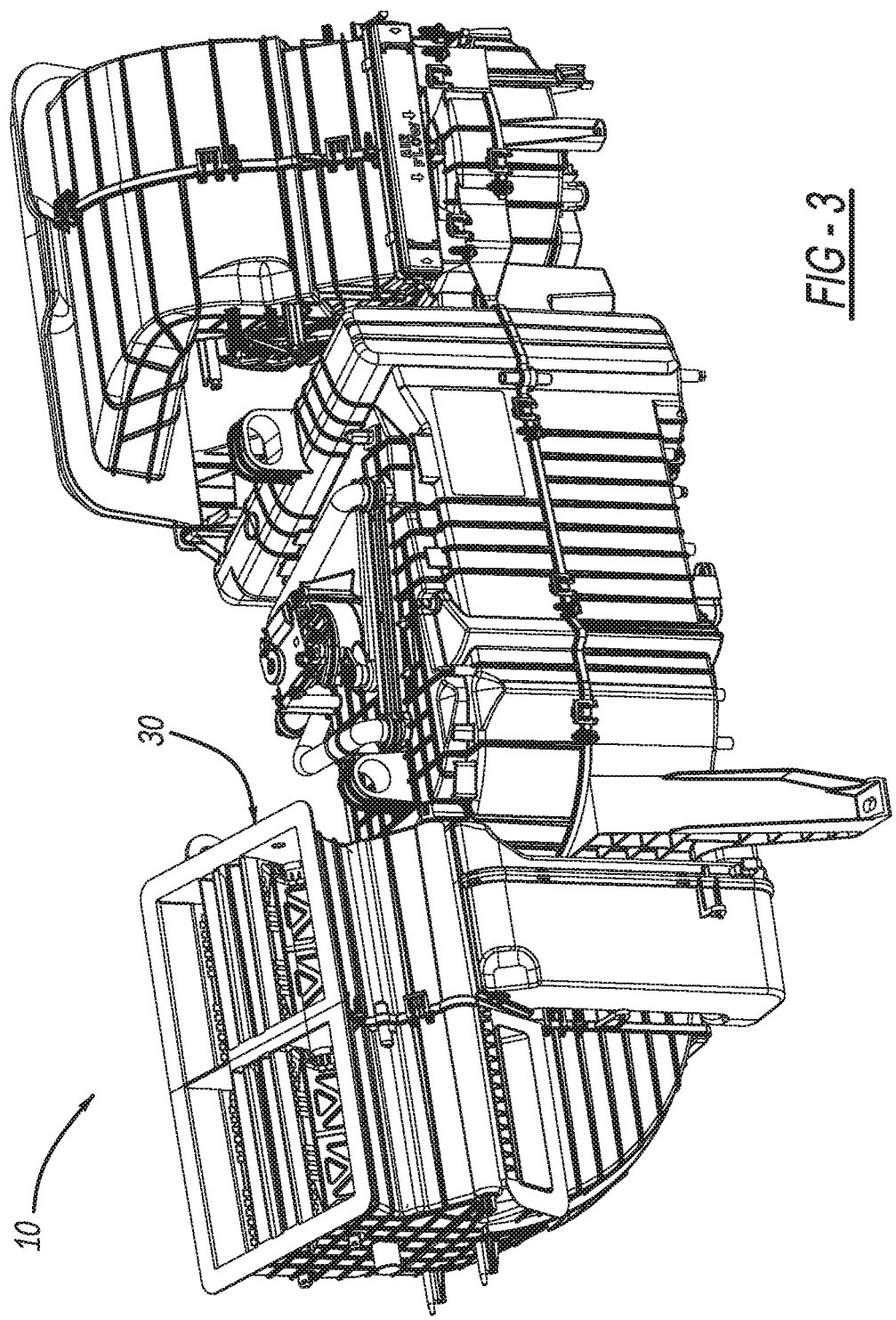
FIG. 3 illustrates an HVAC assembly including an HVAC case in accordance with the present disclosure.

FIG. 3 illustrates a heating, ventilation, and air conditioning (HVAC) assembly 10. The HVAC assembly 10 includes a blower, and may optionally include at least one of a heater core and an evaporator. The HVAC assembly 10 can be a vehicle HVAC assembly, or any other suitable HVAC assembly for heating and/or cooling airflow, such as a building HVAC assembly.

The present disclosure provides for an HVAC case 30. As illustrated in the example of FIG. 3, the HVAC case 30 is included with the HVAC assembly 10. However, the HVAC case 30 may be included with any other suitable HVAC assembly to direct airflow to any suitable location.

Figure 4:
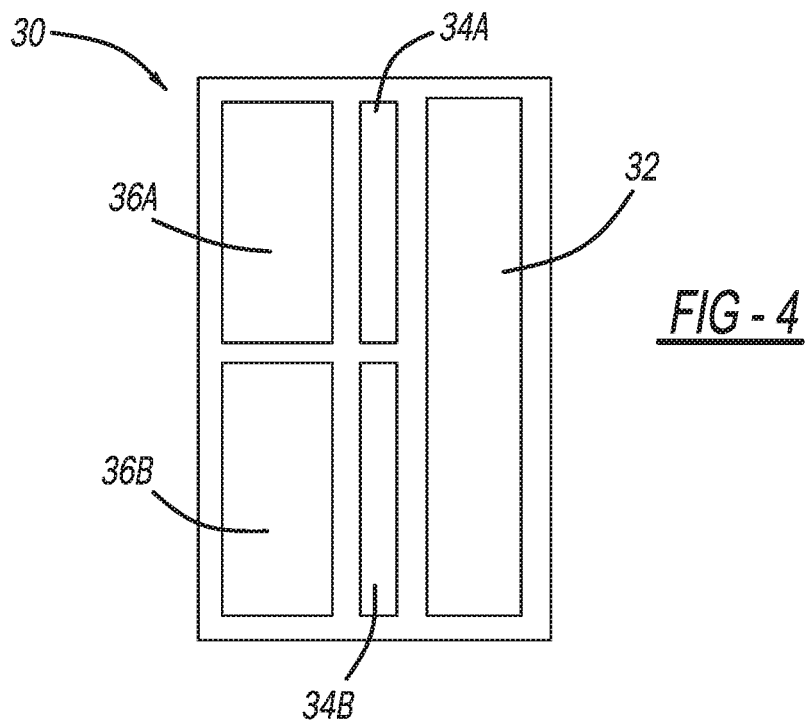
FIG. 4 is an exterior view of outlets of the HVAC case of the present disclosure.

With reference to FIG. 4, the HVAC case 30 defines a defrost outlet 32 and at least one demist outlet. In the example illustrated, two demist outlets 34A and 34B are illustrated. When the HVAC case 30 is included with the HVAC assembly 10 configured as a vehicle HVAC assembly, the defrost outlet 32 can be arranged to direct airflow to a windshield of the vehicle. The demist outlets 34A and 34B are arranged to direct airflow to one or more side windows of the vehicle. The HVAC case 30 further defines one or more face outlets 36A and 36B, which direct airflow towards the upper bodies and faces of persons seated in a passenger cabin of the vehicle. The demist outlets 34A and 34B are arranged between the defrost outlet 32 and the face outlets 36A and 36B. The HVAC case 30 may further include one or more foot outlets 38 (see FIG. 5) for directing airflow towards the feet of those seated in the passenger cabin.

Figure 5:
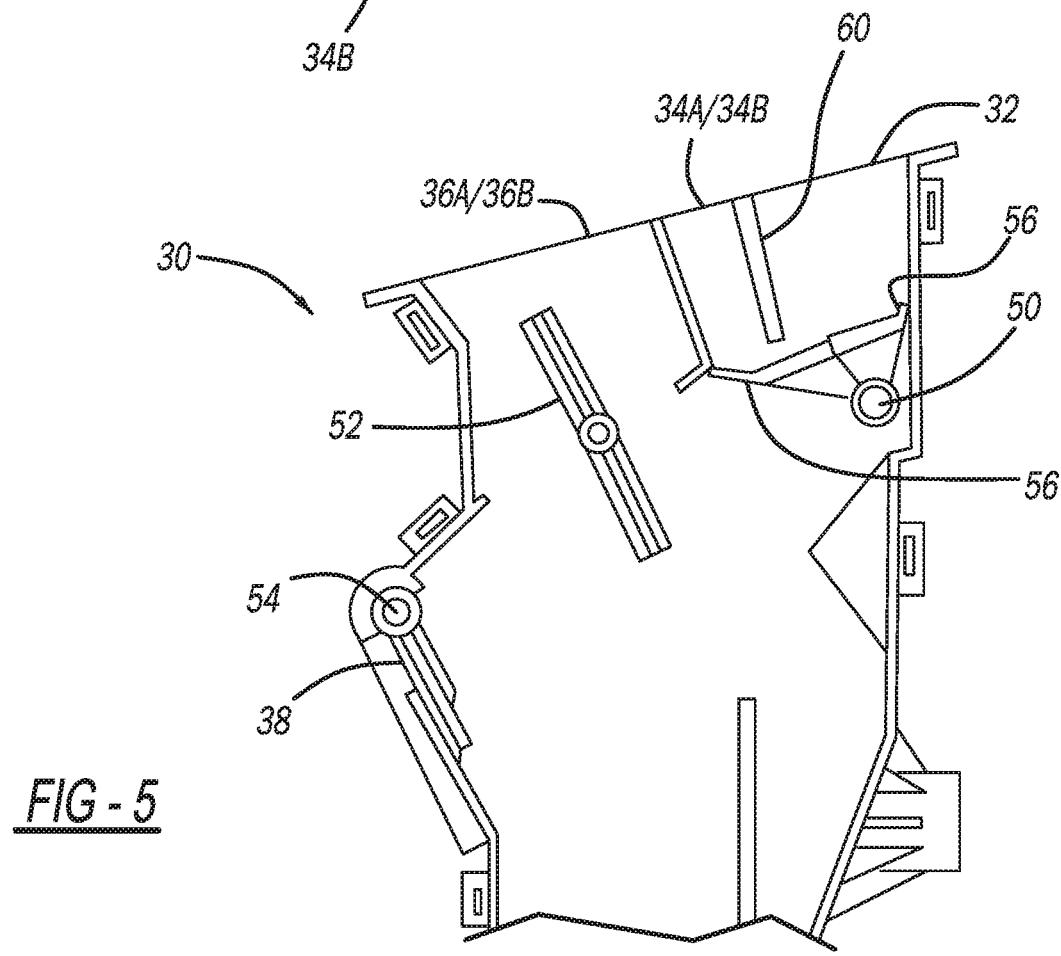
FIG. 5 is a cross-sectional view of the HVAC case of the present disclosure with an airflow control door in a closed position to block airflow through the defrost outlet and the demist outlet.

With reference to FIGS. 5-7, the HVAC case 30 includes a single airflow control door 50, which is movable to control airflow through the defrost outlet 32 and the demist outlets 34A and 34B. The airflow control door 50 includes an elastomeric seal 56, which allows the door 50 to seal against the HVAC case 30 at various different angles. The airflow control door 50 is rotatably mounted within the HVAC case 30 to allow the airflow control door 50 to rotate at any suitable angle, such as up to 100° for example. The HVAC case 30 further includes a door 52 arranged at the face outlets 36A and 36B to control airflow therethrough, and a door 54 arranged at the foot outlet 38 to control airflow therethrough.

In a closed position, as illustrated in FIG. 5, the single airflow control door 50 extends across the defrost outlet 32 and the demist outlets 34A, 34B to restrict airflow therethrough. In a first open position as illustrated in FIG. 6, the airflow control door 50 allows airflow through the defrost outlet 32 and the demist outlets 34A and 34B. This first open position of the airflow control door 50 includes any intermediate or mid position suitable for allowing airflow through both the defrost outlet 32 and the demist outlets 34A and 34B. This first open position thus includes rotation of the airflow control door 50 in either direction from that illustrated in FIG. 6 to vary the amount of airflow through the defrost outlet 32 and the demist outlets 34A and 34B. For example, rotation of the airflow control door 50 counter-clockwise (relative to the view of FIG. 6) will increase airflow to the demist outlets 34A and 34B, while decreasing airflow to the defrost outlet 32. Rotation of the airflow control door 50 clockwise (relative to the view of FIG. 6) will decrease airflow to the demist outlets 34A and 34B, while increasing airflow to the defrost outlet 32.

As illustrated in FIG. 7, the airflow control door 50 is advantageously movable to a second open position at which the airflow control door 50 closes the defrost outlet 32 to block airflow therethrough by contacting wall 60 separating the defrost outlet 32 and the demist outlets 34A and 34B, but also is arranged to permit airflow through the demist outlets 34A and 34B. In some applications, there may be a small gap between the HVAC case 30 and the airflow control door 50 when the door 50 is in the second open position of FIG. 7 to allow a small amount of airflow through the defrost outlet 32. In other applications, the door 50 or the HVAC case 30 may define small holes to allow a small amount of airflow through the defrost outlet 32 when the airflow control door 50 is in the second open position of FIG. 7.

Figure 1:
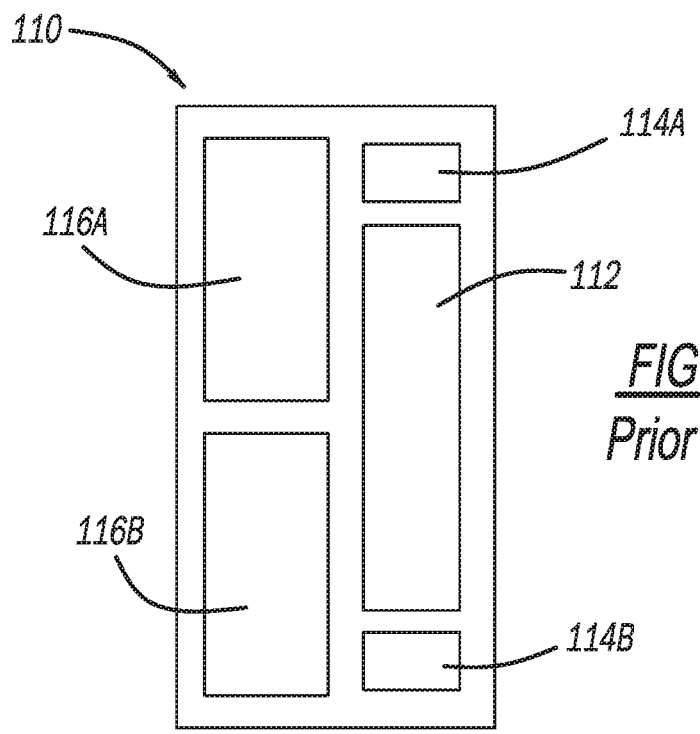
FIG. 1 illustrates outlets of a prior art heating, ventilation, and air conditioning (HVAC) case.
Figure 2:
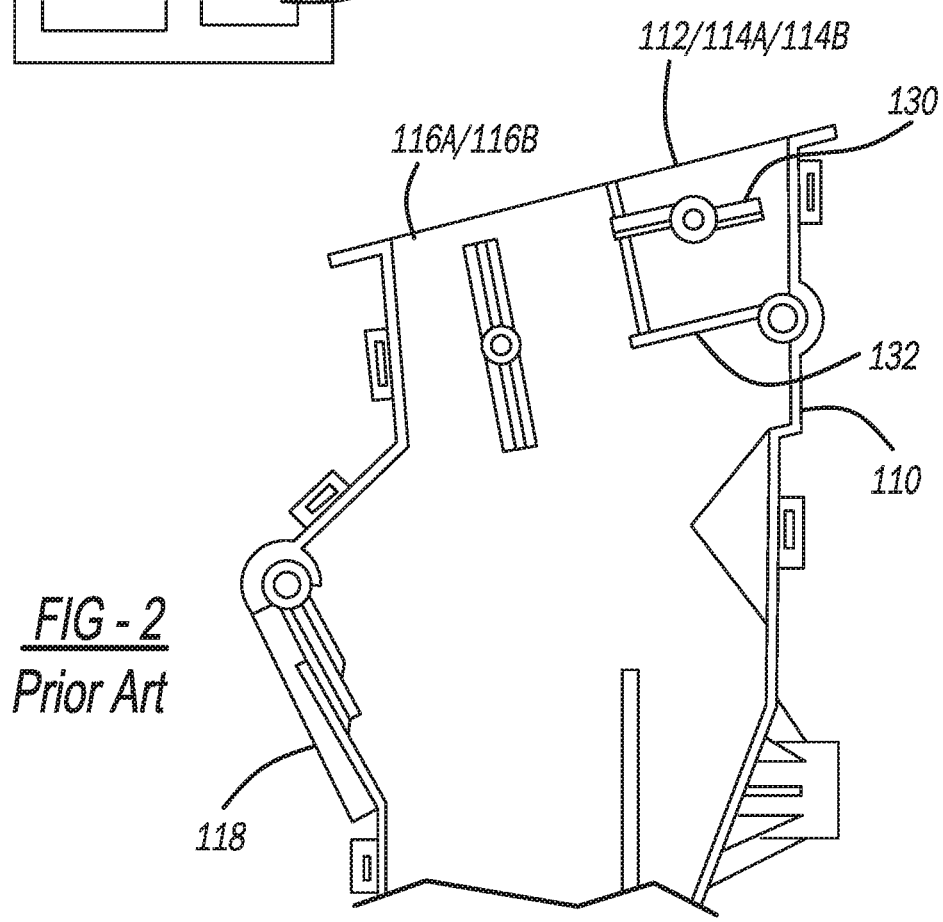
FIG. 2 is a cross-sectional view of the prior art HVAC case of FIG. 1.

Therefore, the single airflow control door 50 can control airflow through the defrost outlet 32 and the demist outlets 34A and 34B. This is in contrast to existing HVAC cases, such as the current HVAC case 110 illustrated in FIGS. 1 and 2, which requires two airflow doors 130 and 132 to control airflow through the defrost outlet 112 and demist outlets 114A and 114B. The single airflow control door 50 according to the present disclosure advantageously eliminates the multiple airflow control doors and multiple door linkages that current HVAC cases require, thus reducing costs and simplifying assembly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heating, ventilation, and air conditioning (HVAC) case comprising:
   a defrost outlet, a demist outlet, and a face outlet defined by the HVAC case, the demist outlet is between the defrost outlet and the face outlet;
   a divider between the face outlet and the demist outlet, the divider including a first portion and a second portion extending from a distal end of the first portion away from the demist outlet, the divider has an L-shape in cross-section with the first portion being longer than the second portion;
   a defrost airflow control door movable to control airflow through each one of the defrost outlet and the demist outlet, the defrost airflow control door is outside of an airflow pathway to the face outlet defined by the HVAC case; and
   a face outlet control door movable to control airflow through the face outlet, the face outlet control door is outside of an airflow pathway to the defrost outlet defined by the HVAC case, the second portion of the divider extends from the first portion towards the face outlet control door.

2. The HVAC case of claim 1, wherein the defrost airflow control door extends across each one of the demist outlet and the defrost outlet to close both the defrost outlet and the demist outlet.

3. The HVAC case of claim 1, wherein the defrost airflow control door includes an elastomeric seal.

4. The HVAC case of claim 1, wherein the defrost airflow control door is movable to simultaneously restrict airflow through the defrost outlet and the demist outlet.

5. The HVAC case of claim 4, wherein the defrost airflow control door is movable to simultaneously restrict airflow through the defrost outlet and permit airflow through the demist outlet.

6. The HVAC case of claim 1, wherein the HVAC case further defines a foot outlet;
   wherein the HVAC case further includes a foot outlet control door movable to control airflow through the foot outlet.

7. The HVAC case of claim 1, wherein the HVAC case is included with an HVAC system having at least one of an evaporator and a heater core.

8. A heating, ventilation, and air conditioning (HVAC) case comprising:
   a defrost outlet, a demist outlet, and a face outlet defined by the HVAC case, the demist outlet is between the defrost outlet and the face outlet;
   a divider between the face outlet and the demist outlet, the divider including a first portion and a second portion extending from a distal end of the first portion away from the demist outlet, the divider has an L-shape in cross-section with the first portion being longer than the second portion;
   a face outlet control door movable to control airflow through the face outlet, the face outlet control door is outside of an airflow pathway to the defrost outlet defined by the HVAC case, the second portion of the divider extends from the first portion towards the face outlet control door; and
   a defrost airflow control door rotatably mounted within the HVAC case outside of an airflow pathway to the face outlet defined by the HVAC case, the defrost airflow control door movable to the following positions:
      a closed position in which the defrost airflow control door extends across both the defrost outlet and the demist outlet to block airflow through the defrost outlet and the demist outlet;
      a first open position in which the defrost airflow control door is positioned to permit airflow past the defrost airflow control door and out of the HVAC case through the defrost outlet and the demist outlet simultaneously;
      a second open position in which the defrost airflow control door extends across the defrost outlet to block airflow therethrough, and is positioned to permit airflow past the defrost airflow control door and out of the HVAC case through the demist outlet.

9. The HVAC case of claim 8, wherein the defrost airflow control door includes an elastomeric seal that contacts an interior surface of the HVAC case when the defrost airflow control door is in the closed position.

10. The HVAC case of claim 9, wherein the elastomeric seal contacts a divider wall of the HVAC case separating the defrost outlet and the demist outlet when the defrost airflow control door is in the second open position.

11. The HVAC case of claim 8, wherein the HVAC case further defines a foot outlet;
    wherein the HVAC case further includes a foot outlet control door movable to control airflow through the foot outlet.

12. The HVAC case of claim 8, wherein the HVAC case is included with an HVAC system having at least one of an evaporator and a heater core.

13. The HVAC case of claim 8, wherein:
    in the first open position the defrost airflow control door is movable in a first direction to increase airflow through the demist outlet and decrease airflow through the defrost outlet; and
    in the first open position the defrost airflow control door is movable in a second direction to decrease airflow through the demist outlet and increase airflow through the defrost outlet.

\* \* \* \* \*